March 3, 1964 R. A. KEIDEL ETAL 3,123,702
DEEP GROOVE ARC WELDING APPARATUS
Filed Jan. 11, 1962 3 Sheets-Sheet 1

INVENTORS
RALPH A. KEIDEL
GEORGE METROPULOS
BY *Andrus & Starke*
Attorneys

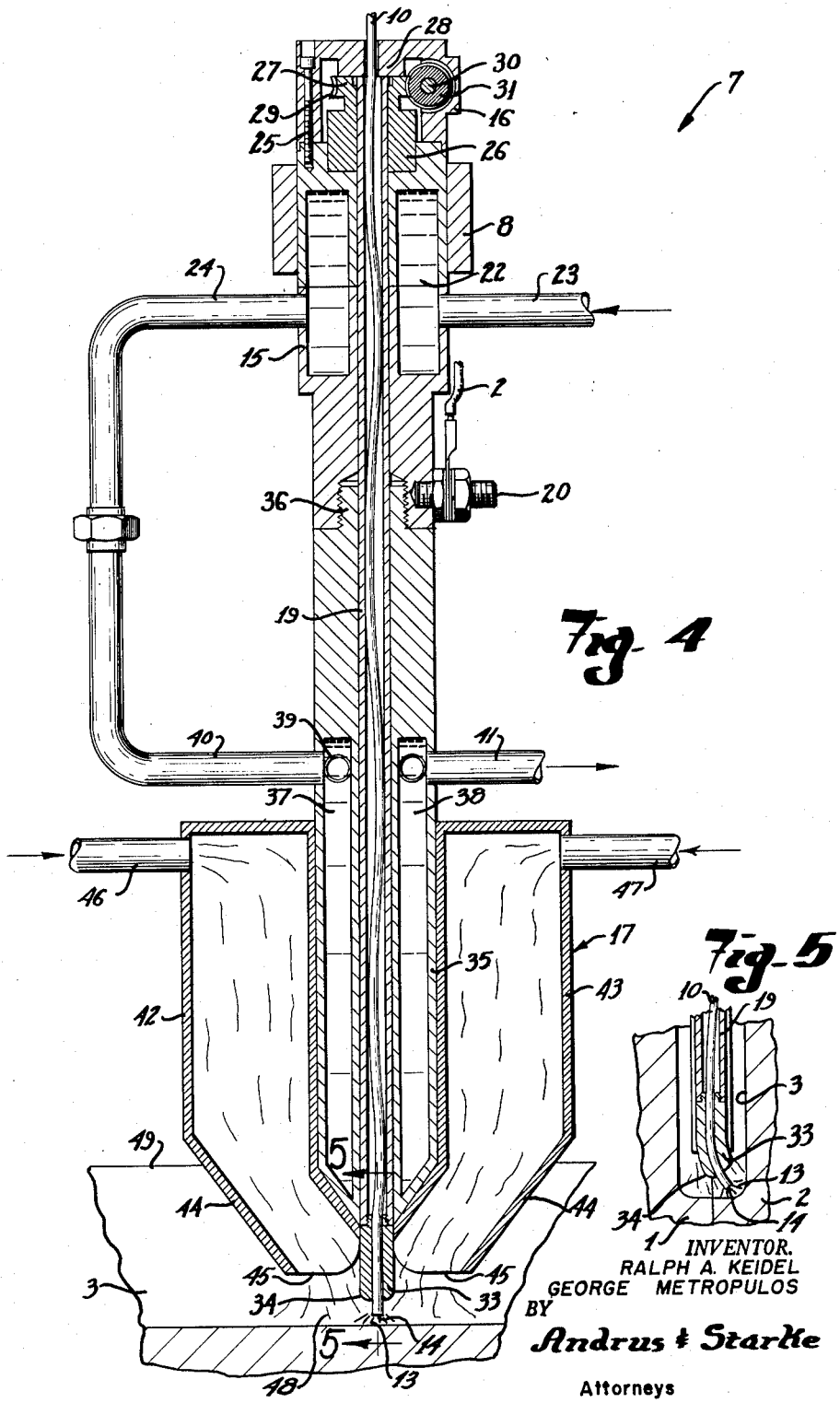

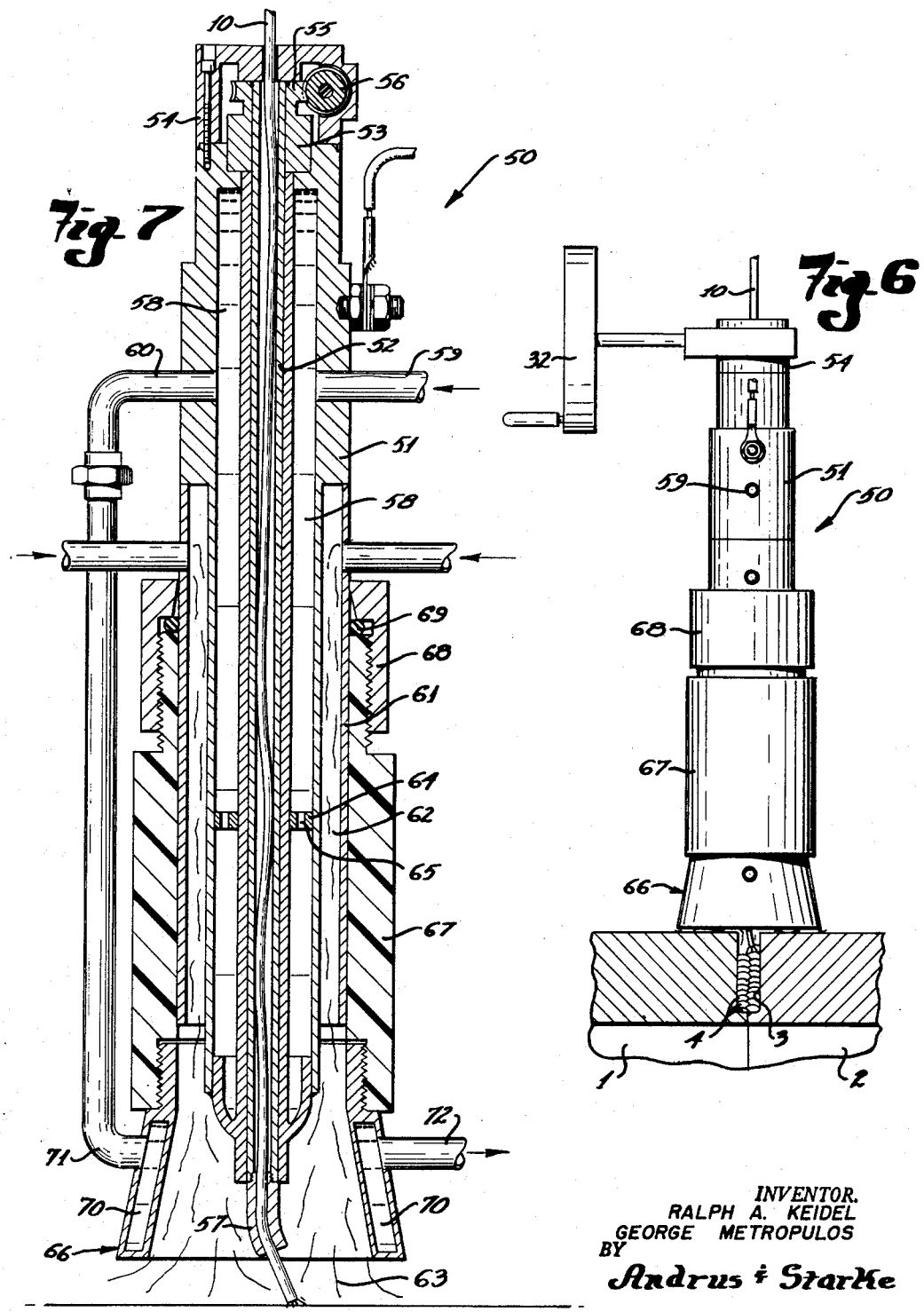

3,123,702
DEEP GROOVE ARC WELDING APPARATUS
Ralph A. Keidel, Milwaukee, and George Metropulos, Menomonee Falls, Wis., assignors to A. O. Smith Corporation, Milwaukee, Wis., a corporation of New York
Filed Jan. 11, 1962, Ser. No. 165,602
8 Claims. (Cl. 219—74)

This invention relates to a method and apparatus for arc welding in a relatively deep narrow groove in metallic work.

Gas shielded arc welding processes have been developed for joining adjacent metal members by striking a welding arc between the tip of an electrode and the work members. A gaseous envelope or shield is maintained overlying the arc to prevent adverse contamination of the weld by the surrounding atmosphere and particularly to exclude oxygen from the weld.

For example, adjacent tubular sections may be joined to form a multi layer vessel. A narrow, deep groove is formed by suitable machining of the abutting ends of the tubular sections and successive layers or beads of weld metal are deposited within the groove to join the sections. Generally, such welding has only been accomplished with manually controlled or hand welding wherein an operator manually manipulates a welding gun. The operator continuously manipulates the weld gun to insure maintenance of the proper gas shield. Automatic welding has been generally impracticable because of the difficulty in maintaining a satisfactory gas shield or envelope over the arc.

The present invention is directed to an improved method for automatically welding in a narrow deep groove and is particularly directed to a method and apparatus employing a narrow nozzle adapted to fit within the groove for depositing of the initial layers of the weld metal and employing a different generally bell-shaped arc welding nozzle construction for depositing the outermost and the final layers of the weld metal. The present invention also provides an improved contact tube construction for use with the nozzle in depositing the successive weld beads to opposite sides of the groove.

In accordance with the present invention, the initial layers of the weld metal within the base of the groove are deposited by employing a welding nozzle having a very narrow lower end including a central water cooled nozzle body with a pair of oppositely disposed external gas shields. The nozzle construction is formed with a relatively flat rectangular cross section such that the lower end thereof can be located between the walls of the groove with the terminal ends of the gas shield passageways immediately adjacent the terminal end of the electrode to provide a complete envelope about the arc. As the weld metal fills the groove, the nozzle is moved outwardly. When the lower end of the nozzle is generally aligned with the outer edges of the groove, a certain amount of air syphoning occurs. The air is drawn into the gas envelope and causes undesirable weld characteristics such as porosity. In accordance with this invention, the outermost layers or beads of the weld are established with a welding nozzle having a generally bell-shaped gas nozzle. The gas shield overlies the outer edges of the deep groove immediately above the abutting sections and provides a relatively large gas shield or envelope which excludes the air flow into the arc.

In accordance with another aspect of this invention, the electrode is passed through a guide tube terminating at its lower end in a curved contact tip. The contact tube is rotatably mounted whereby the end of the contact tube can be directed toward either side of the groove. Alternate weld beads are deposited within the groove generally to opposite sides of the center line of the groove. Each of the beads overlap with the immediately adjacent bead however to provide a continuous build up within the welding groove.

The present invention provides a method and arc welding apparatus particularly adapted for automatic welding in deep narrow grooves.

The drawings furnished herewith illustrate the best mode presently contemplated for carrying out the invention.

In the drawings:

FIG. 4 is an enlarged vertical section through the arc welding nozzle assembly shown in FIGS. 2 and 3;

FIG. 5 is a vertical section taken on lines 5—5 of FIG. 4;

FIG. 6 is a side elevational view similar to FIG. 2 illustrating a bell nozzle construction for depositing the final layers of the weld within the narrow groove; and FIG. 7 is an enlarged vertical section, similar to FIG. 4, of the nozzle assembly shown in FIG. 6.

Figure 1:
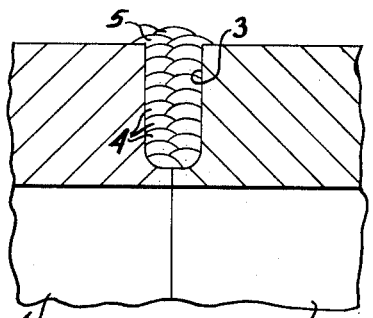
FIG. 1 is a fragmentary cross sectional view of a weld joining abutting tubular sections.

Referring to the drawings and particularly to FIG. 1, a pair of tubular work sections 1 and 2 are shown mounted end-to-end in abutting relation. The abutting ends are machined to form a relatively deep narrow weld groove 3 of a generally U-shaped cross section which has been filled with a multiple layer weld formed of a plurality of inner weld beads 4 and a plurality of outer weld beads 5.

The inner weld beads 4 are deposited with a welding head assembly 6 shown in FIGS. 2–5 and described as follows.

The weld head assembly 6 includes a welding nozzle unit 7 secured by a suitable supporting structure 8 in alignment with the groove 3 of the abutting tubular work sections 1 and 2. An electrode reel 9 is mounted above nozzle unit 7 and carries a coil of consumable wire electrode 10 which is fed downwardly through the nozzle unit 7. Suitable opposed drive rolls 11 are secured as a part of the welding head assembly 6 between the reel 9 and nozzle unit 7 and frictionally grip the electrode 10. A suitable drive motor 12 is coupled to operate the rolls 11 at a suitable speed for continuously feeding the electrode 10 to the groove 3. A power source, not shown, is connected between the electrode 10 and the work sections 1 and 2 to establish an arc 13 between the tip 14 of the electrode 10 and the walls of the groove 3.

The work sections 1 and 2 are rotatably mounted with respect to the weld head assembly 6 in any suitable manner, not shown, for successive depositing of continuous circumferential weld beads 4 within the groove 3.

The illustrated nozzle unit 7, which is constructed in accordance with the present invention, includes a vertically intermediate contact body 15 having a worm and pinion gear box 16 secured to the upper end and a rectangular nozzle 17 secured to the lower end thereof. A split clamp 18 forming a part of structure 8 encircles the contact body 15 and is attached to releasably mount the nozzle unit 7 with the lower end of the rectangular nozzle 17 located within the weld groove 3.

Referring particularly to FIG. 4, the contact body 15 is generally a cylindrical member having a central axial opening within which a copper contact tube 19 is removably secured. The contact tube 19 directs the electrode 10 downwardly through the nozzle unit 7 and is somewhat larger than the diameter of the electrode 10 to allow ready passage of the electrode therethrough.

A contact lug 20 is secured to the outer side of the contact body 15 and is connected to a suitable power line 21. Welding current is fed to the electrode 10 through the contact body 15 as subsequently described.

A water cooling chamber 22 is provided in the upper portion of the contact body 15 immediately above the contact lug 20 to prevent excessive heating due to current flow through the body 15. A water inlet conduit 23 and a water outlet conduit 24 are connected to opposite sides of the water cooling chamber 22 for the continuous circulation of water through the chamber during a welding operation.

The worm and pinion gear box 16 is generally an inverted cup-shaped housing having an outer diameter generally corresponding to the diameter of the body 15. Bolts 25 pass axially through the outer portion of the box 16 and are threaded into suitably tapped openings in the upper end of the contact body 15 to secure the box 16 with the lower edge thereof abutting the top end of body 15.

A contact block 26 is brazed or otherwise secured to the upper end of the contact tube 19 with the lower end resting in a correspondingly shaped recess in the top of body 15 and the upper end disposed within the gear box 16. A gear hub 27 is secured to the top of the block 26 and engages an inwardly projecting boss 28 on the internal top wall of the gear box 16.

When the bolts 25 are tightly drawn up, the boss 28 bears on the hub 27 and holds the contact block 26 in firm engagement with the base of the recess in the contact body 15. This establishes a relatively low resistance path for the transfer of current from contact body 15 to the contact tube 19 via the contact block 26.

Figure 2:
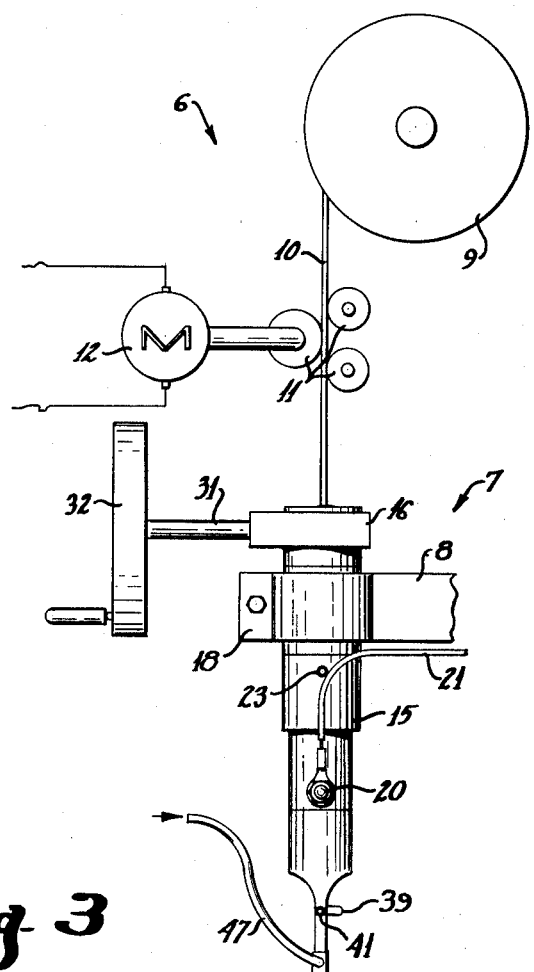
FIG. 2 is a front elevational view of arc welding apparatus for depositing the innermost layers or beads of the weld shown in FIG. 1.
Figure 3:
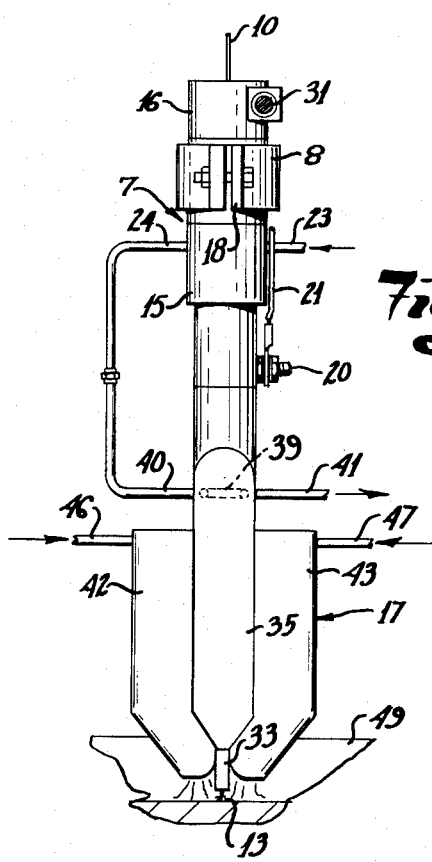
FIG. 3 is a side elevational view of the apparatus and a fragmentary portion of the tubular sections shown in FIG. 1.

A pinion gear 29 is secured to the hub 27 within gear box 16. The worm gear 30 is rotatably mounted within the box 16 on a worm gear shaft 31 in mesh with gear 29. Shaft 31 projects horizontally outwardly from the gear box 16 and a hand wheel 32 is affixed to the outer end thereof, as shown in FIG. 2, for manual rotation of the worm gear 30. The rotation of the gear 30 is transferred through the pinion gear 29 to the contact tube 19 which projects downwardly through the contact body 15 and the rectangular nozzle 17.

A curved contact tube tip 33 is attached by a threaded connection and forms a continuation of the contact tube 19. The curved contact tube tip 33 is formed of alkonite or other similar suitable material having good wear resistant and spatter resistant properties. The terminal end of the tip 33 is rounded as at 34 to further reduce the problem of spatter pickup.

The angular position of the curved contact tube tip 31 is manually controlled by actuation of hand wheel 30 to alternately direct the tip 33 and the tip 14 of electrode 10 toward the opposite walls of the groove 3. This results in the double beading in the formation of the weld by alternately left and right depositing of the inner weld beads 4, as most clearly shown in FIG. 1.

The curved contact tube tip 33 further establishes constant sliding engagement with the electrode 10 at the curvature of the tip 33. The driving force on electrode 10 establishes a positive force at the area of sliding engagement and creates a minimum resistance to the transfer of current to the electrode 10 from the contact tube 19. As a result, the current from the power lines 21 passes through the contact body 15 to the contact block 26 and then through the contact tube 19 and tip 33 to the point of sliding engagement with electrode 10 at which point the current transfers to the electrode 10. The constant position of current transfer to the electrode 10 causes a similar heating of the electrode 10 and a constant voltage drop between the tip 14 of electrode 10 and the current transfer point. Both factors contribute to establishment of a highly satisfactory welding arc 13.

The illustrated rectangular nozzle 17 includes a central water cooled body 35 having a cylindrical upper portion secured by a threaded projection 36 threaded into a correspondingly tapped opening in the lower end of the contact body 15. The lower end of the body 35 is machined to provide a rectangular cross sectional configuration having a central longitudinal opening through which the contact tube 19 passes. Water cooling passages 37 and 38 extend along the outer opposite edges of the water cooled body 35 and are joined at the upper ends by a jumper tube 39. A water inlet conduit 40 is connected to the upper end of the water cooling passage 37 and to the outlet conduit 24 from the contact body 15. A water outlet conduit 41 is connected to the upper end of the passage 38 to complete the circulating path for the cooling water through the body 35.

Rectangular gas shielding tubes 42 and 43 are brazed or otherwise secured to the opposite edges of the body 35 with the principle plane of the tubes 42 and 43 in the principle plane of the rectangular cross sectional portion of the body 35. The lower ends of the gas tubes 42 and 43 are curved inwardly as at 44 with gas discharge openings 45 facing downwardly and inwardly toward the tip 14 of the electrode 10. Gas inlet conduits 46 and 47 connect the gas tubes 42 and 43, respectively, to a suitable source, not shown, of shielding gas to establish a gas envelope 48 over the arc 13.

A coating of gystal or other suitable spatter resistant medium, not shown, preferably covers the exposed surfaces of the body 35 and the gas tubes 42 and 43 to eliminate or substantially reduce the fusing of spatter to the corresponding portion of nozzle 17. The body 35 and the tubes 42 and 43 are preferably formed of aluminum bronze or some similar material which is highly spatter resistant.

The operation of the welding nozzle assembly 7 shown in FIGS. 2–5 is summarized as follows.

The tubular sections 1 and 2 are suitably supported adjacent the weld head assembly 6 with the nozzle 17 aligned with and projecting into the groove 3. The contact tube tip 33 is aligned with the left side of the groove 3, as viewed in FIGS. 1 and 2, by suitable rotation of the hand wheel 32. The power supply is completed through power lines 21 and the motor 12 is energized to feed electrode 10 through nozzle unit 7 and thereby establish and maintain the arc 13. The sections 1 and 2 are rotated to form the continuous innermost weld bead 4, shown in FIG. 1. The arc 13 is continuous and after completion of the first weld bead 4, the electrode tube tip 33 is rotated to direct the end 14 of electrode 10 to the opposite side of the weld groove 3, and the succeeding weld bead 4 is deposited within the weld groove 3 and fuses with the adjacent metal of the weld groove 3 and with the adjacent portion of the first deposited inner weld bead 4.

The inner weld beads 4 are in this manner successively built up within the groove 3.

As the weld is built up in the groove 3, the nozzle 17 is withdrawn from groove 3 to maintain proper positioning of the tip 14 of electrode 10 with respect to the immediately previously deposited weld beads 4. When the discharge openings 45 of gas tubes 42 and 43 approach the outer edges 49 of groove 3, and a relatively shallow weld groove is created, the shielding gas flow establishes a suction tending to draw air into the groove 3 and the gas envelope 48.

Referring particularly to FIGS. 6 and 7, a water cooled nozzle unit 50 is illustrated for welding in a shallow groove such as is created by the inner weld beads 4 of groove 3.

The illustrated nozzle unit 50 includes an elongated cylindrical contact and nozzle body 51 having a copper contact tube 52, corresponding to tube 19, extending downwardly coextensively therethrough. The current transfer from body 51 to electrode 10 generally corresponds to that of the previously described nozzle unit 7 and includes a contact block 53 secured to the upper end of the contact tube 52 which is clamped in firm engagement with the upper end of body 51 by a gear box 54. A pinion gear 55 is secured to the contact block 53 and a worm gear 56 is provided for rotating of the contact tube 52. A curved contact tip 57, also corresponding to the contact tip 33 previously described, is secured to the lower end of the contact tube 52.

If desired, the contact tube and gear box assemblies of the nozzle units 7 and 50 may be common and readily interchanged to the respective contact bodies 15 and 51 for deep groove and shallow groove welding, respectively.

An annular water cooling chamber 58 is provided within the contact and nozzle body 51 and is connected by an inlet conduit 59 and an outlet conduit 60 to a source of cooling water to continuously circulate the water through the body 51.

An outer shell 61 is concentrically secured to a reduced lower portion of the nozzle body 51 and terminates in rearwardly spaced relation to the curved contact tip 57. The shell 61 is spaced radially outwardly of body 51 to define a gas passageway 62 through which a shielding gas is passed to establish a gas envelope 63 overlying the arc.

In accordance with the present invention, a diffusion washer 64 is secured within the gas passageway 62 generally intermediate the length thereof. Washer 64 includes a plurality of circumferentially distributed apertures or openings 65 to allow the gas to pass downwardly through the gas passageway 62 to the discharge end.

A gas shielding nozzle 66 is secured extending downwardly from the lower end of the concentric shell 61 and generally terminates in the horizontal plane of the contact tip 57. The nozzle 66 is generally a frustum of a right circular cone which diverges outwardly from shell 61 to project laterally beyond the edges 49 of groove 3. The nozzle 66 is removably secured to shell 61 as follows.

A fiber tube 67 is telescoped over the concentric shell 61 with the lower end recessed and threaded to receive a correspondingly threaded portion of the nozzle 66. A collet ring 68 is threaded onto the upper end of the fiber tube 67 and collapses the fiber tube 67 about the shell 61 to frictionally grip the shell 61 and lock the nozzle in position. A suitable O-ring seal 69 is disposed between the lower end of the collet ring 68 and the adjacent portion of the tube 67 to create a fluid tight joint and prevent drawing of air and the like downwardly into the gas envelope 63.

A cooling chamber 70 is formed within the nozzle 66 with a water inlet conduit 71 connected to the water outlet conduit 60 from the contact and nozzle body 51. A water outlet conduit 72 is connected to the cooling chamber 70 for circulation of water therethrough.

The nozzle unit 50 illustrated in FIGS. 6 and 7 is substituted for the nozzle unit 7 shown in FIGS. 2–5 to deposit the outer weld beads 5 in groove 3.

The gas envelope 63 created by the bell-shaped nozzle 66 completely envelops the arc area and extends over the adjacent edges 49 of the weld groove 3 to prevent introduction of air or the like into the arc. Consequently, the adverse effects of oxygen and the like are eliminated and a continuous high strength weld is produced.

The present invention thus provides a method and apparatus for automatic welding in relatively deep grooves with the production of sound welds which have normally heretofore only been obtained through manual arc welding or the like.

Various modes of carrying out the invention are contemplated as being within the scope of the following claims particularly pointing out and distinctly claiming the subject matter which is regarded as the invention.

We claim:

1. The process of welding within a deep groove, comprising depositing the initial base weld beads by gas-shielded arc welding apparatus having a nozzle of rectangular cross section projecting within the groove, the lower end of said nozzle including shielding gas openings to envelop the arc in a shielding gas, and depositing the outer weld beads by gas-shielded arc welding apparatus having a bell-shaped gas-shield nozzle completely overlying the top of the weld groove.

2. The process of depositing a weld within a deep groove, comprising depositing the initial base weld beads by gas-shielded arc welding apparatus having a narrow nozzle having gas directing tube means projecting within the groove and creating a gas cover over the arc, and depositing the outer weld beads by gas-shielded arc welding apparatus having a bell-shaped gas-shield nozzle completely overlying the top of the weld groove and creating a gas cover over the arc and the adjacent edges of the groove.

3. The process of forming a weld within a deep groove in metal work by gas-shielded arc welding, comprising mounting a welding nozzle assembly with a generally flat rectangular lower end projected into the groove, said nozzle including means to selectively direct an electrode to the opposite wall portions of the groove and to create a shielding gas cover over the arc, depositing a series of inner weld beads in the deep groove with alternate beads being deposited on generally opposite sides of the groove, mounting a welding nozzle with a bell-shaped shielding gas nozzle assembly overlying the weld groove and the adjacent portion of the work, said bell-shaped nozzle assembly including means to selectively direct an electrode to the opposite wall portions of the groove, and depositing a series of outer weld beads upon the inner weld beads previously deposited to fill the deep grooves.

4. A contact tube assembly for arc welding, comprising a contact support, a contact tube rotatably mounted in the contact support, a lower curved contact tube tip releasably secured to the end of the contact tube, and means coupled to the contact tube to rotate the contact tube and change the location of the end of the tube tip.

5. The construction of claim 4 wherein the contact tube tip is formed of alkonite material and is provided with a rounded discharge end.

6. In a welding nozzle for arc welding in the inner portion of a deep narrow groove, a rectangularly shaped contact body having a longitudinal passageway for accommodating an electrode and rectangular gas-shielding passageways arranged in coplanar relation to the narrow edges of the contact body for insertion into the groove, and means to introduce a shielding gas into the tubes for establishing a gas envelope over an arc.

7. In a welding nozzle for arc welding in the inner portion of a deep narrow groove by striking of an arc between an electrode and the groove, a rectangularly shaped contact body having a longitudinal passageway for accommodating an electrode, a pair of gas-shielding tubes of rectangular cross section secured in coplanar relation to the narrow edges of the contact body for insertion into the groove, and means to introduce a shielding gas into the tubes for establishing a gas envelope over an arc.

8. The welding nozzle construction of claim 7 wherein said gas-shielding tubes extend beyond the end of the contact body and have gas discharge openings facing inwardly and downwardly.

References Cited in the file of this patent

UNITED STATES PATENTS

| | | |
|---|---|---|
| 1,508,711 | Noble | Sept. 16, 1924 |
| 1,749,765 | Henrickson | Mar. 11, 1930 |
| 2,590,084 | Bernald | Mar. 25, 1952 |
| 2,702,846 | Breymeier | Feb. 22, 1955 |
| 2,859,328 | Sohn | Nov. 4, 1958 |
| 2,977,457 | Houldcraft et al. | Mar. 28, 1961 |

FOREIGN PATENTS

| | | |
|---|---|---|
| 863,983 | France | Jan. 8, 1941 |